(12) United States Patent
Lewis et al.

(10) Patent No.: US 9,894,390 B2
(45) Date of Patent: Feb. 13, 2018

(54) ALTERING ORIENTATION OF DATA STREAMS

(71) Applicant: AT&T Mobility II, LLC, Atlanta, GA (US)

(72) Inventors: John E. Lewis, Lawrenceville, GA (US); Justin McNamara, Dunwoody, GA (US); Fulvio Cenciarelli, Suwanee, GA (US); Jeffrey Mikan, Atlanta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 14/333,018

(22) Filed: Jul. 16, 2014

(65) Prior Publication Data

US 2016/0029049 A1   Jan. 28, 2016

Related U.S. Application Data

(62) Division of application No. 12/341,143, filed on Dec. 22, 2008, now Pat. No. 8,850,489.

(51) Int. Cl.

| | |
|---|---|
| *H04N 7/16* | (2011.01) |
| *H04N 21/234* | (2011.01) |
| *G06Q 30/02* | (2012.01) |
| *H04N 21/235* | (2011.01) |
| *H04N 21/435* | (2011.01) |
| *H04N 21/44* | (2011.01) |
| *H04N 21/647* | (2011.01) |
| *H04N 21/81* | (2011.01) |
| *H04L 29/06* | (2006.01) |
| *H04L 29/08* | (2006.01) |
| *H04N 21/2543* | (2011.01) |
| *H04N 21/258* | (2011.01) |
| *H04N 21/45* | (2011.01) |
| *H04N 21/478* | (2011.01) |
| *H04N 21/4786* | (2011.01) |
| *H04N 21/61* | (2011.01) |

(52) U.S. Cl.
CPC ....... *H04N 21/23424* (2013.01); *G06Q 30/02* (2013.01); *H04L 65/604* (2013.01); *H04L 65/607* (2013.01); *H04L 67/20* (2013.01); *H04L 67/306* (2013.01); *H04N 21/235* (2013.01); *H04N 21/2543* (2013.01); *H04N 21/25891* (2013.01); *H04N 21/435* (2013.01); *H04N 21/44016* (2013.01); *H04N 21/4532* (2013.01); *H04N 21/4786* (2013.01); *H04N 21/47815* (2013.01); *H04N 21/6125* (2013.01); *H04N 21/64784* (2013.01); *H04N 21/812* (2013.01); *H04N 21/8126* (2013.01); *H04L 67/04* (2013.01); *H04L 67/303* (2013.01)

(58) Field of Classification Search
CPC . H04N 21/812; H04N 21/8126; H04N 21/235
USPC ............... 725/32, 91, 100, 1, 114; 455/466
See application file for complete search history.

(56) References Cited

U.S. PATENT DOCUMENTS

| | | |
|---|---|---|
| 5,640,569 A | 6/1997 | Miller et al. |
| 6,363,419 B1 | 3/2002 | Martin, Jr. et al. |
| 7,177,832 B1 | 2/2007 | Semret et al. |
| 7,900,229 B2 | 3/2011 | Dureau |

(Continued)

*Primary Examiner* — Nnenna Ekpo
(74) *Attorney, Agent, or Firm* — Baker & Hostetler LLP

(57) ABSTRACT

Various techniques for enhancing wireless networks and/or devices that can receive wireless signals are disclosed.

19 Claims, 11 Drawing Sheets

(56) References Cited

U.S. PATENT DOCUMENTS

| | | | |
|---|---|---|---|
| 8,238,965 B2 | 8/2012 | Baluja et al. | |
| 8,595,186 B1* | 11/2013 | Mandyam | G06F 8/38 |
| | | | 707/632 |
| 2003/0065611 A1* | 4/2003 | Li | G06Q 30/08 |
| | | | 705/37 |
| 2005/0136897 A1 | 6/2005 | Praveenkumar et al. | |
| 2007/0011704 A1 | 1/2007 | Anglin | |
| 2007/0033531 A1* | 2/2007 | Marsh | G06Q 30/02 |
| | | | 715/738 |
| 2008/0263583 A1 | 10/2008 | Heath | |
| 2009/0025047 A1 | 1/2009 | Choi et al. | |
| 2010/0060792 A1* | 3/2010 | Corlett | H04N 19/85 |
| | | | 348/583 |
| 2010/0081375 A1* | 4/2010 | Rosenblatt | G08C 17/02 |
| | | | 455/41.1 |
| 2010/0115546 A1 | 5/2010 | Hanafee et al. | |
| 2010/0186025 A1 | 7/2010 | Thomas et al. | |

\* cited by examiner

ALTERING ORIENTATION OF DATA STREAMS

CROSS REFERENCE TO RELATED APPLICATIONS

The instant application is a divisional application of, and claims priority to, U.S. patent application Ser. No. 12/341,143 filed Dec. 22, 2008. U.S. patent application Ser. No. 12/341,143 is incorporated herein by reference in its entirety.

BACKGROUND

In a few short years wireless devices have evolved from merely communication platforms to powerful computer systems that include new and interesting features. Consumers routinely switch to the wireless device or network that has the "coolest" features and the network operators increasingly try to stay ahead of their competitors in terms of what features are unique to their service or devices. Accordingly, additional features are desirable.

SUMMARY

In embodiments of the present disclosure, a method is provided that includes, but is not limited to receiving a data stream over a data channel, the data stream including video content and information, the information added by a network operator, the information including at least pricing information; identifying the information in the data stream and displaying the video content and displaying at least the pricing information, the pricing information displayed on top of the video content. In addition to the foregoing, other method aspects are described in the following detailed description, claims, and text that form the present disclosure.

In embodiments of the present disclosure, a method is provided that includes, but is not limited to encoding real time network use information into one or more frames; adding the one or more frames of real time network use information to one or more frames of video thereby generating a data stream, the real time network use information configured to be displayed on top of the video when the video is displayed, the data stream encoded in one or more packets conforming to a real-time transport protocol; and sending the data stream to a device. In addition to the foregoing, other mobile device aspects are described in the following detailed description, claims, and text that form the present disclosure.

In embodiments of the present disclosure, a method is provided that includes, but is not limited to receiving a request for a data channel from a device, the request including a price; determining, based on the price, to service the request for the data channel; establishing the data channel with the device; and charging an account associated with the device an amount, the amount based on the price. In addition to the foregoing, other computer readable storage medium aspects are described in the following detailed description, claims, and text that form the present disclosure.

It can be appreciated by one of skill in the art that one or more various aspects of the disclosure may include but are not limited to circuitry and/or programming for effecting the herein-referenced aspects of the present disclosure; the circuitry and/or programming can be virtually any combination of hardware, software, and/or firmware configured to effect the herein-referenced aspects depending upon the design choices of the system designer.

The foregoing is a summary and thus contains, by necessity, simplifications, generalizations and omissions of detail. Those skilled in the art will appreciate that the summary is illustrative only and is not intended to be in any way limiting.

DETAILED DESCRIPTION

Figure 1:
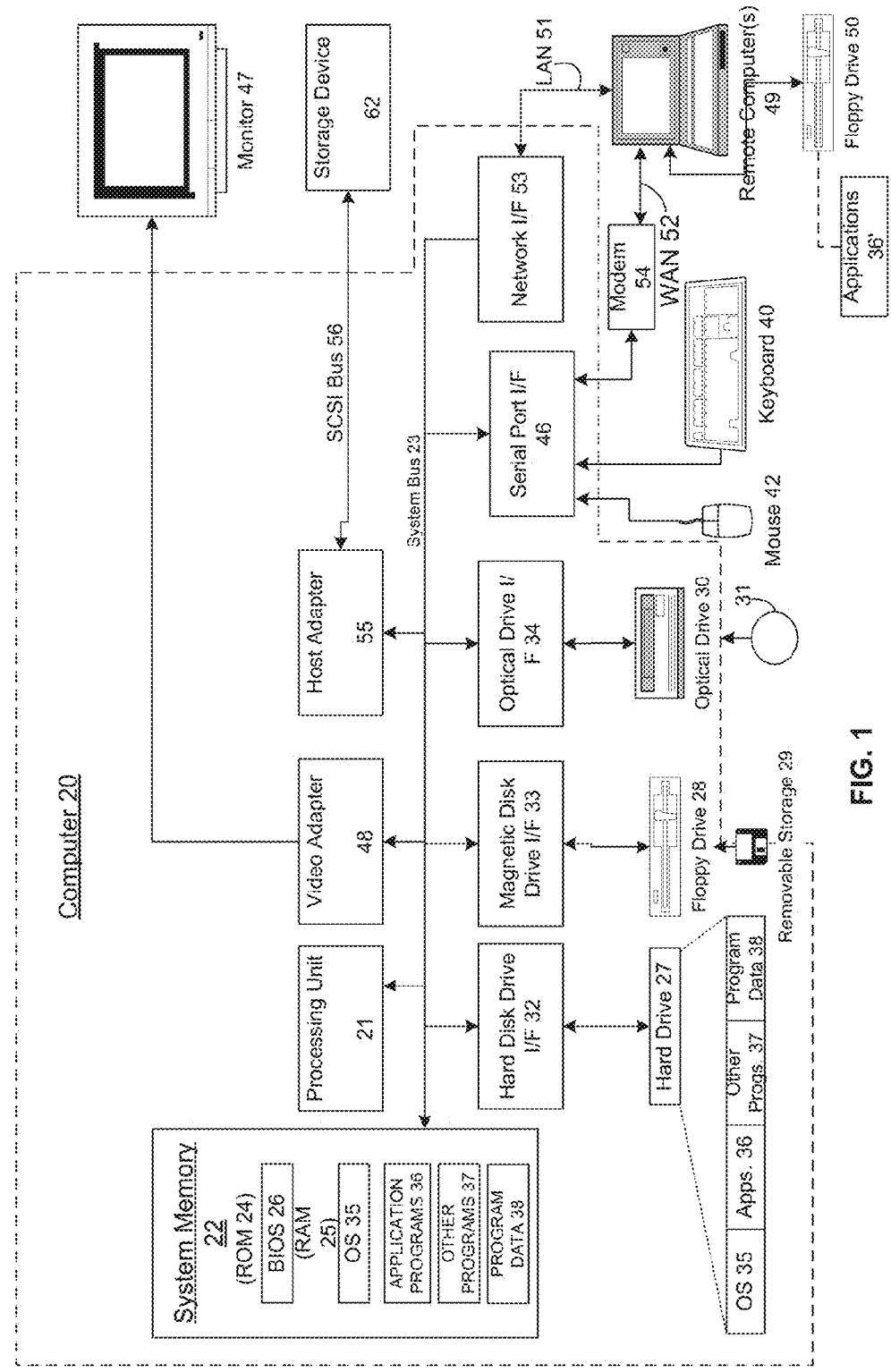
FIG. 1 depicts an example computer system wherein aspects of the present disclosure can be implemented.

Embodiments may execute on one or more computers. FIG. 1 and the following discussion is intended to provide a brief general description of a suitable computing environment in which the disclosure may be implemented. One skilled in the art can appreciate that the computer system of FIG. 1 can be used in the operational environments depicted by FIG. 3 and FIG. 4.

The term circuitry used through the disclosure can include hardware components such as hardware interrupt controllers, hard drives, network adaptors, graphics processors, hardware based video/audio codecs, and the firmware/software used to operate the hardware for example. In the same or other embodiments the term circuitry can include microprocessors configured to perform function(s) by firmware or by switches that have been set. In the same or other example embodiments the term circuitry can include one or more logical processors, e.g., one or more cores of a multi-core processor. The logical processor(s) in this example can be configured by software instructions embodying logic operable to perform function(s) that are loaded from memory, e.g., RAM, ROM, firmware, etc. In example embodiments where circuitry includes a combination of hardware and software an implementer may write source code embodying logic that is subsequently compiled into machine readable code that can be processed by the logical processor(s). Since one skilled in the art can appreciate that the state of the art has evolved to a point where there is little difference between hardware, software, or a combination of hardware/software, the selection of hardware versus software to effectuate specific functions is a design choice. That is, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Referring now to FIG. 1, an exemplary computing system is depicted. The computing system can include a conventional computer 20 or the like and can include a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the computer 20, such as during start up, is stored in ROM 24. The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. In some example embodiments computer executable instructions embodying aspects of the present disclosure may be stored in a computer readable storage medium, e.g., magnetic disk 29, ROM 24, RAM 25, removable storage, e.g., FLASH RAM (not shown), optical disk 31, and/or a cache of processing unit 21. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A display 47 or other type of display device can also be connected to the system bus 23 via an interface, such as a video adapter 48. In addition to the display 47, computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The computer 20 may operate in a networked environment using logical connections to one or more remote computers, such as a remote computer 49. The remote computer 49 may be another computer, a server, a router, a network PC, a peer device or other common network node, and typically can include many or all of the elements described above relative to the computer 20, although only a memory storage device 50 has been illustrated in FIG. 1. The logical connections depicted in FIG. 1 can include a local area network (LAN) 51 and a wide area network (WAN) 52. Such networking environments are commonplace in offices, enterprise wide computer networks, intranets and the Internet.

When used in a LAN networking environment, the computer 20 can be connected to the LAN 51 through a network interface or adapter 53. When used in a WAN networking environment, the computer 20 can typically include a modem 54 or other means for establishing communications over the wide area network 52, such as the Internet. The modem 54, which may be internal or external, can be connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Figure 2:
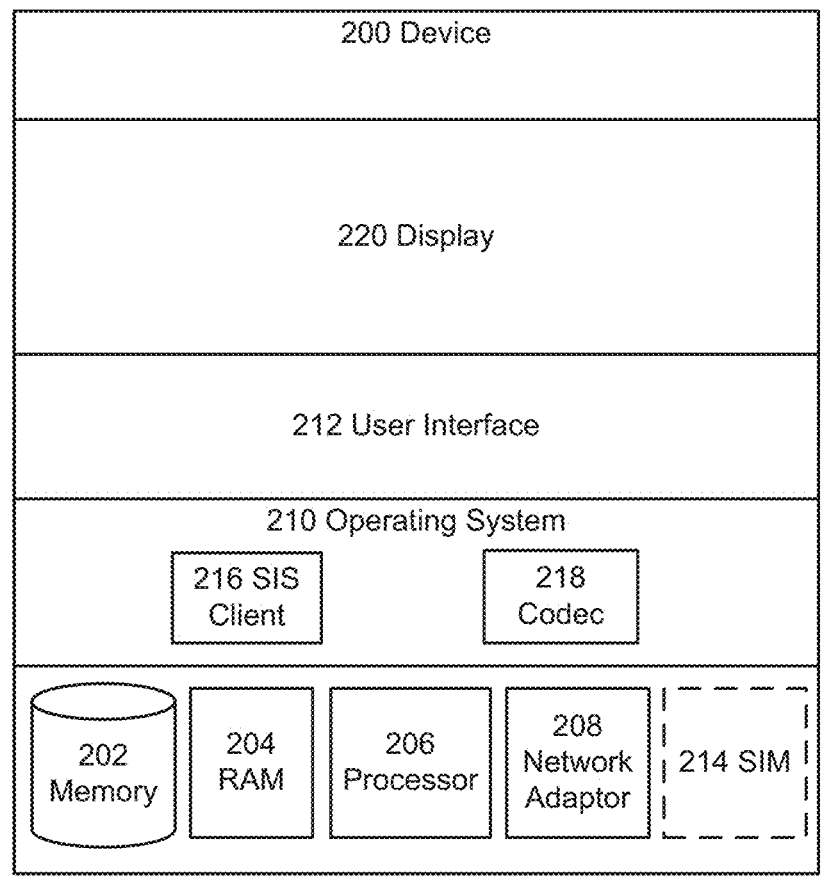
FIG. 2 depicts an example device.

Referring now to FIG. 2, it generally illustrates an example device 200 that can be used in embodiments of the present disclosure. Generally, device 200 can be, but is not limited to, a laptop/desktop computer, a mobile phone, e.g., cell phone, personal digital assistant, smartphone, etc. Device 200 can include the same or similar components as computer 20 of FIG. 1. For example, device 200 can include components such as storage 202, e.g., persistent storage such as a flash memory, random access memory 204, one or more logical processors 206, a network adaptor 208, e.g., an interface and/or a wireless adaptor that can send and receive radio signals conforming to a protocol such as the advanced mobile phone system protocol, a code division multiple access protocol, a time division multiple access protocol, 802.11, etc. In mobile phone embodiments the device 200 can include a SIM card 214 having an International Mobile Subscriber Identity (IMSI), which is a unique identifier of a subscriber.

As shown by the figure, an operating system 210 can be stored in memory 202 and executed by the processor 206. Generally, the operating system 210 can act as a platform for other applications. For example, the operating system 210 could include a kernel mode and a user mode. The kernel mode can include instructions that, when executed by processor 206, configure the processor 206 to effectuate one or more services such as a file system, a scheduler, a memory manager, security system, and the like. The operating system 210 can expose interfaces to some or all of these services to applications installed in the operating system 210 such as SIS client 216 and codec 218 which are described in more detail below. Additionally, the device 200 can include a user interface 212 that can comprise a keyboard, a mouse, a touchpad, a touch screen, etc., and a display 220, e.g., a liquid crystal display.

Figure 3:
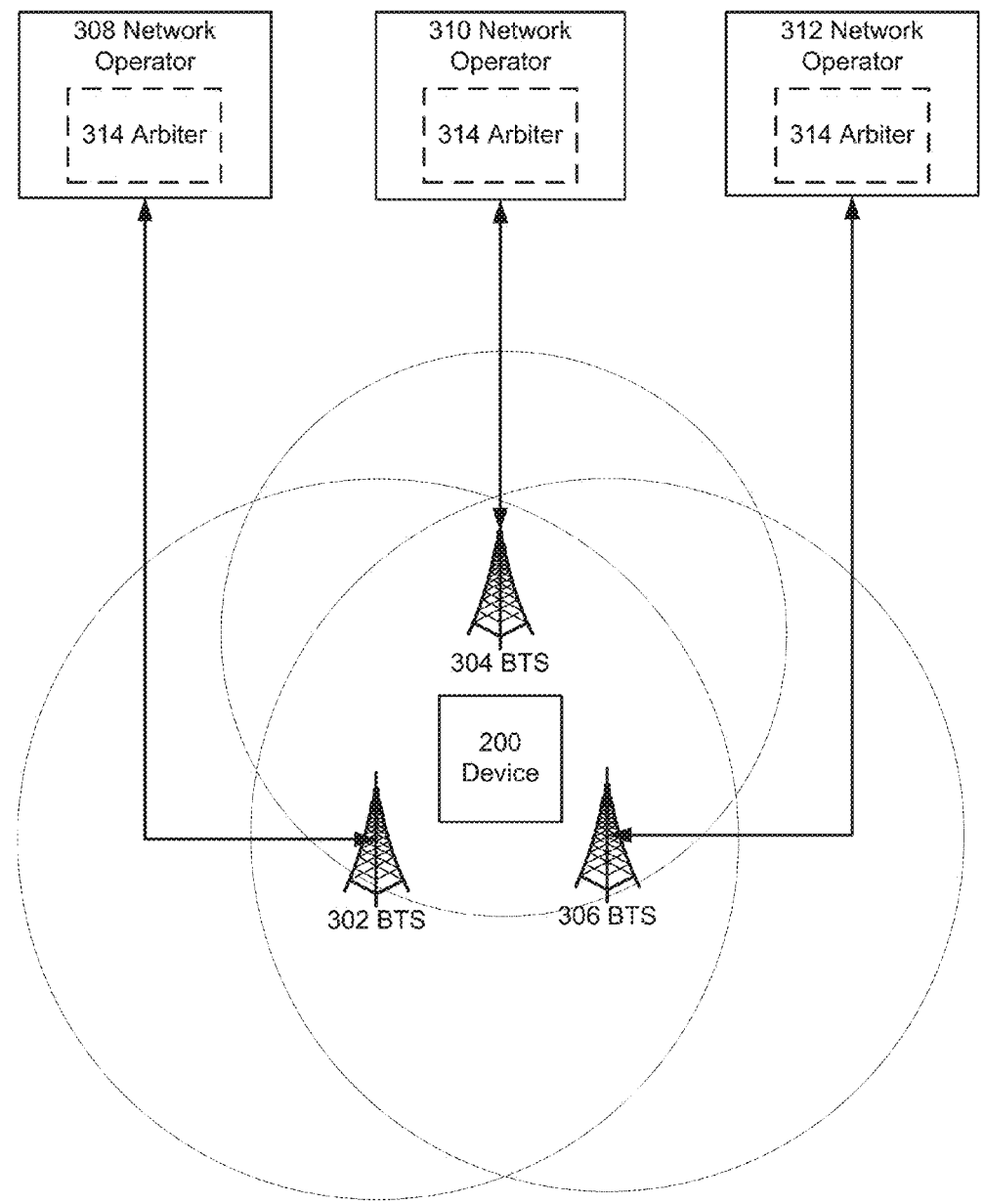
FIG. 3 depicts an example operating environment wherein aspects of the present disclosure can be implemented.

Referring now to FIG. 3, it illustrates an example operating environment that can be used. Generally, the figure depicts device 200 within range of three wireless signals, shown by the circles surrounding the base transceiver stations (BTS) 302-306. In an embodiment the BTSs are part of wireless communication networks such as GSM, CDMA, and/or WAN based networks. As shown by the figure, in an embodiment each BTS can be maintained by a different network operator 308, 310, and 312. Generally, the network operators can have a radio spectrum to operate and the equipment needed to effectuate wireless services. Continuing with the description of FIG. 3, one or more network operators 308-312 can have an arbitrator 314, which is described in more detail in the following paragraphs. Briefly, the arbitrator 314 and network operators 308-312 can be effectuated by circuitry.

Figure 4:
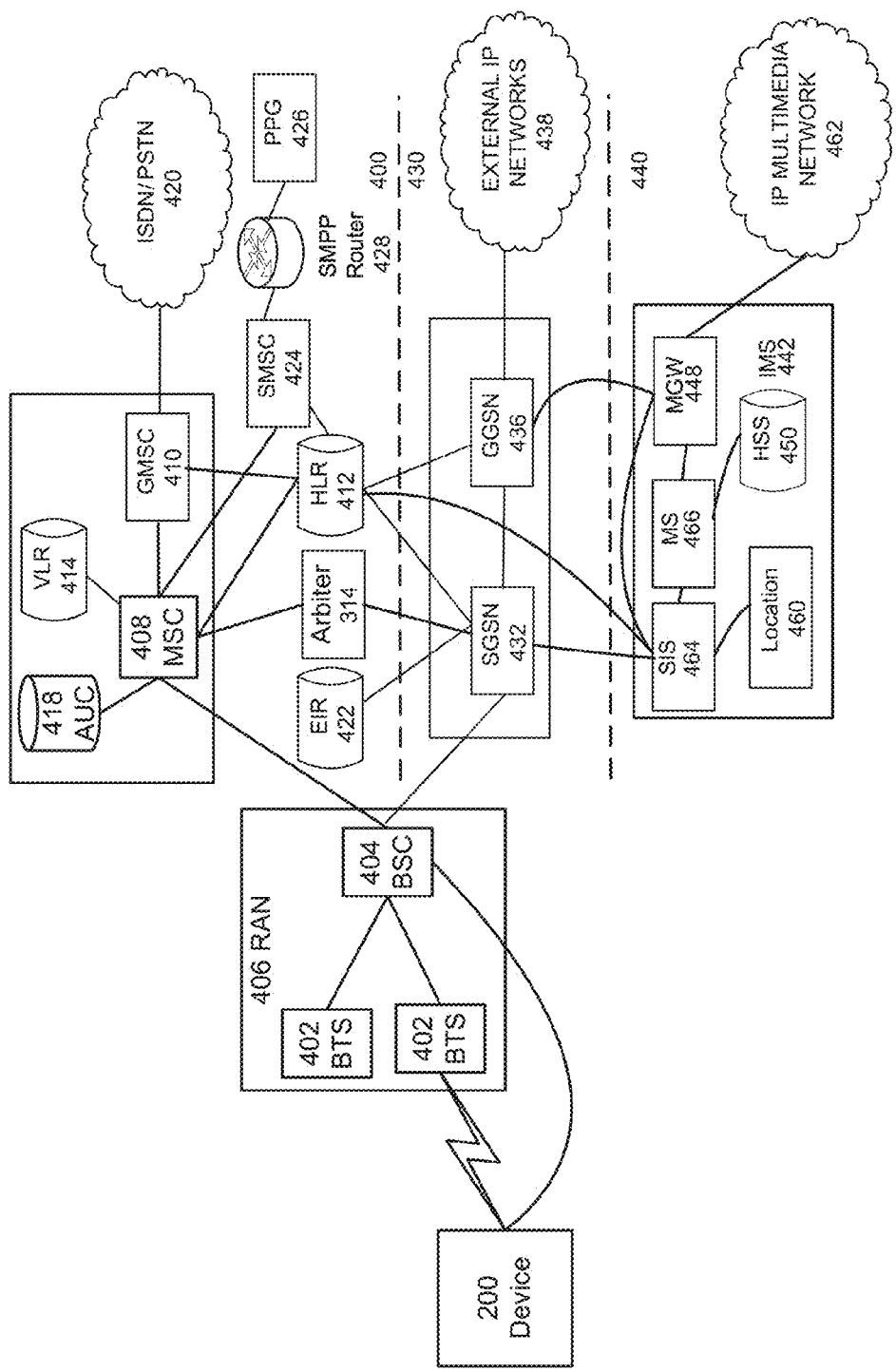
FIG. 4 depicts an example operating environment wherein aspects of the present disclosure can be implemented.

Referring now to FIG. 4, it illustrates an exemplary block diagram view of a multimedia network architecture that can be used in aspects of the present disclosure. Briefly, each block can include circuitry to effectuate the herein described operations. The depicted architecture includes a core network 400, a GPRS network 430, and an IP multimedia network 440. The core network 400 can include at least one Base Transceiver Station (BTS) 402 and a Base Station Controller (BSC) 404. The BTS 402 is physical equipment, such as a radio tower, that enables a radio interface to communicate with the device 200. Each BTS may serve more than one device. The BSC 404 manages radio resources, including the BTS. The BSC may be connected to several BTSs. The BSC and BTS components, in combination, are generally referred to as a base station (BSS) or radio access network (RAN) 406.

The core network 400 also includes a Mobile Switching Center (MSC) 408, a Gateway Mobile Switching Center (GMSC) 410, a Home Location Register (HLR) 412, Visitor Location Register (VLR) 414, an Authentication Center (AuC) 418, and an Equipment Identity Register (EIR) 416. The MSC 408 performs a switching function for the network. The MSC 408 also performs other functions, such as registration, authentication, location updating, handovers, and call routing. The GMSC 410 provides a gateway between the core network and other networks, such as an Integrated Services Digital Network (ISDN) or Public Switched Telephone Networks (PSTNs) 420. Thus, the GMSC 410 provides interworking functionality with external networks.

The HLR 412 is a database that contains administrative information regarding each subscriber registered in a corresponding network. The HLR 412 also contains the current location of each device. The VLR 414 is a database that contains selected administrative information from the HLR 412. The VLR contains information necessary for call control and provision of subscribed services for each device currently located in a geographical area controlled by the VLR. The HLR 412 and the VLR 414, together with the MSC 408, provide call routing and roaming capabilities. The AuC 418 provides the parameters needed for authentication and encryption functions. Such parameters allow verification of a subscriber's identity. The EIR 422 stores security-sensitive information about the mobile equipment.

A Short Message Service Center (SMSC) 424 allows one-to-one Short Message Service (SMS) messages to be sent to/from the device 200. A Push Proxy Gateway (PPG) 426 is used to "push" (i.e., send without a synchronous request) content to the device 200. The PPG 426 acts as a proxy between wired and wireless networks to facilitate pushing of data to the device 200. A Short Message Peer to Peer (SMPP) protocol router 428 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to services, such as speech, data, and short message service (SMS), the device 200 first registers with the network to indicate its current location by performing a location update and IMSI attach procedure. The device 200 sends a location update including its current location information to the MSC/VLR, via the BTS 402 and the BSC 404. The location information is then sent to the device's HLR. The HLR is updated with the location information received from the MSC/VLR. The location update also is performed when the device moves to a new location area. Typically, the location update is periodically performed to update the database as location updating events occur.

The GPRS network 430 is logically implemented on the core network architecture by introducing two packet-switching network nodes, a serving GPRS support node (SGSN) 632, a cell broadcast and a Gateway GPRS support node (GGSN) 434. The SGSN 432 is at the same hierarchical level as the MSC 408 in the core network. The SGSN controls the connection between the GPRS network and the device 200. The SGSN also keeps track of individual device's locations and security functions and access controls.

The GGSN 436 provides a gateway between the GPRS network and a public packet network (PDN) or other IP networks 438. That is, the GGSN provides interworking functionality with external networks, and sets up a logical link to the device 200 through the SGSN. When packet-switched data leaves the GPRS network, it is transferred to an external TCP-IP network 438, such as an X.25 network or the Internet. In order to access GPRS services, the device 200 first attaches itself to the GPRS network by performing an attach procedure. The device 200 then activates a packet data protocol (PDP) context, thus activating a packet communication session between the device, the SGSN, and the GGSN.

The IP multimedia network 440 was introduced with 3GPP Release 5, and includes an IP multimedia subsystem (IMS) 442 to provide rich multimedia services to end users. A representative set of the network entities within the IMS 442 are a call/session control function, a media gateway control function, a media gateway (MGW) 448, and a master subscriber database, called a home subscriber server (HSS) 450. The HSS 450 may be common to the core network 400, the GPRS network 430 as well as the IP multimedia network 462. Generally, a media server 466 (MS) can store media such as streaming media, ring tones, or other content that can be accessed by devices. Also shown is a streaming information service 464 that can interface with the media server 466, GGSN 436, HSS, 450, etc., in order to add content to video streams that are sent to the devices.

The HSS 450 contains a subscriber profile and keeps track of which core network node is currently handling the subscriber. It also supports subscriber authentication and authorization functions (AAA). In networks with more than one HSS 450, a subscriber location function provides information on the HSS 450 that contains the profile of a given subscriber.

The following are a series of flowcharts depicting implementations of processes. For ease of understanding, the flowcharts are organized such that the initial flowcharts present implementations via an overall "big picture" viewpoint. Those having skill in the art will appreciate that the style of presentation utilized herein (e.g., beginning with a presentation of a flowchart(s) presenting an overall view and thereafter providing additions to and/or further details in subsequent flowcharts).

Figure 5:
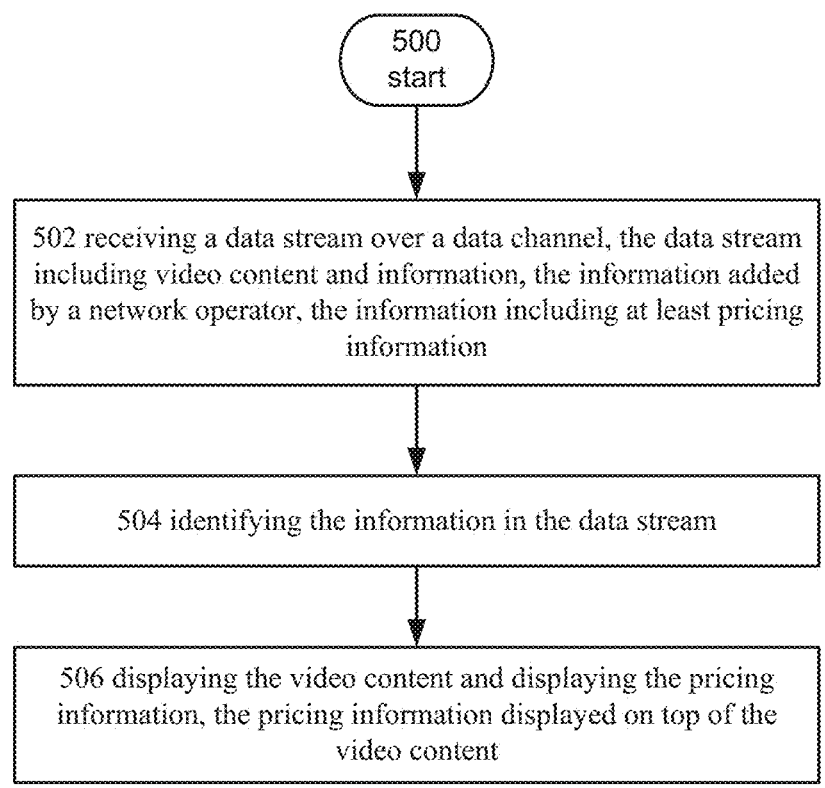
FIG. 5 depicts operational procedure for practicing aspects of the present disclosure.

Referring now to FIG. 5 it depicts example operations 500, 502, 504, 506, and 508. Operation 500 begins the operational procedure and operation 502 illustrates receiving a data stream over a data channel, the data stream including video content and information, the information added by a network operator, the information including at least pricing information. A data stream can be received by a network adaptor 208 of a device 200 of FIG. 2. For example, the BST 402 of FIG. 4 can be assigned a plurality of channels, e.g., frequencies that can be allocated to devices, e.g., smartphones, laptops including wireless access cards, etc., so that they may send/receive telephone calls, send/receive data, etc. In an embodiment a data channel can be established and packets indicative of the data stream can be received over the data channel. The data stream can include video content and information added by a network operator.

In one example embodiment the video content can be streamed from, for example, an external IP network 438 or from a media server 466. That is, device 200 could receive content hosted by a website and/or on-demand content from the network operator. In a specific example, the video content can be hosted by a website and the device 200 may request the content. IP packets indicative of the video content can be received by, for example, the GGSN 436; forwarded to the MGW 448; and forwarded to the application server streaming information service 464.

The SIS 464 can add information to the video stream such as, for example, pricing information, e.g., information that identifies the price of the video, the price of the bandwidth used to transfer the video, etc. Generally, bandwidth is the capacity of the network to transfer data over a connection and is usually measured in bits/s or multiples, e.g., KB or MB. In this example the SIS 464 can receive information identifying the size of the streaming video and determine how much bandwidth is being consumed by the transfer operation. The information can then be encoded into the video content; the stream can be placed in one or more packets; and the packets can be routed back to the GGSM 436, and eventually to the device 200. In another example the SIS 464 can receive the video stream and calculate the amount of bandwidth that has been consumed in real time; the information can then be encoded into the video content; the stream can be placed in one or more packets; and the packets can be routed back to the GGSM 436, and eventually to the device 200. In this example the device 200 can receive real-time pricing information for the video that is being streamed through the mobile network.

Continuing with the description of FIG. 5, operation 504 shows identifying the information in the data stream. The processor 206 can execute instructions and identify that the inband portion of the data stream includes video content and information. In an example the device 200 can identify the information in the data stream using a video codec 218. This information can then be sent to the streaming information service client application (SIS client) 216. For example, the codec 218 could parse each frame of the video content and determine whether the content is video or added information. If the frame is information, e.g., XML content, then the codec 218 can then send the information to the streaming information service client application 216. In another embodiment the processor 206 can execute instructions of the SIS client 216 and identify that a portion of the data stream includes information. Instead of routing the entire data stream through the codec 218, the SIS client 216 can send the portion of the data stream that includes the video content to the codec 218.

Referring now to operation 506, it depicts displaying the video content and displaying at least the pricing information, the pricing information displayed on top of the video content. For example, codec 218 can output a bitmap and/or graphics commands that can be executed by the processor 206, and the processor 206 can render the video content on display 220. In this example the processor 206 can execute the SIS client 216 and can be configured to render the information on the display 220 on top of the video content. In an embodiment the information could include price information that can be rendered on top of the video content while the video is playing, i.e., it could be continuously displayed, it could be displayed when user input is received, it could be displayed intermittently, etc. The price information could identify a price associated with the amount of bandwidth used to stream the video, a price associated with an amount of minutes used to stream the video, a price associated with the on-demand content, a price associated with roaming, etc. In another example, the information received from the network operator can be combined with information stored on the device 200 and the combination can be displayed or information derived from both the received and stored data can be displayed. For example, the total monthly amount of bandwidth consumed by the device 200 could be stored in memory 202 and the SIS client application 216 could generate instructions to display the total amount and increment the amount with the information obtained from the video content. In another example the number of minutes used in the billing period can be stored on the device 200 and the remainder can be updated based on the information received from the network operator and the remaining amount can be displayed.

Figure 6:
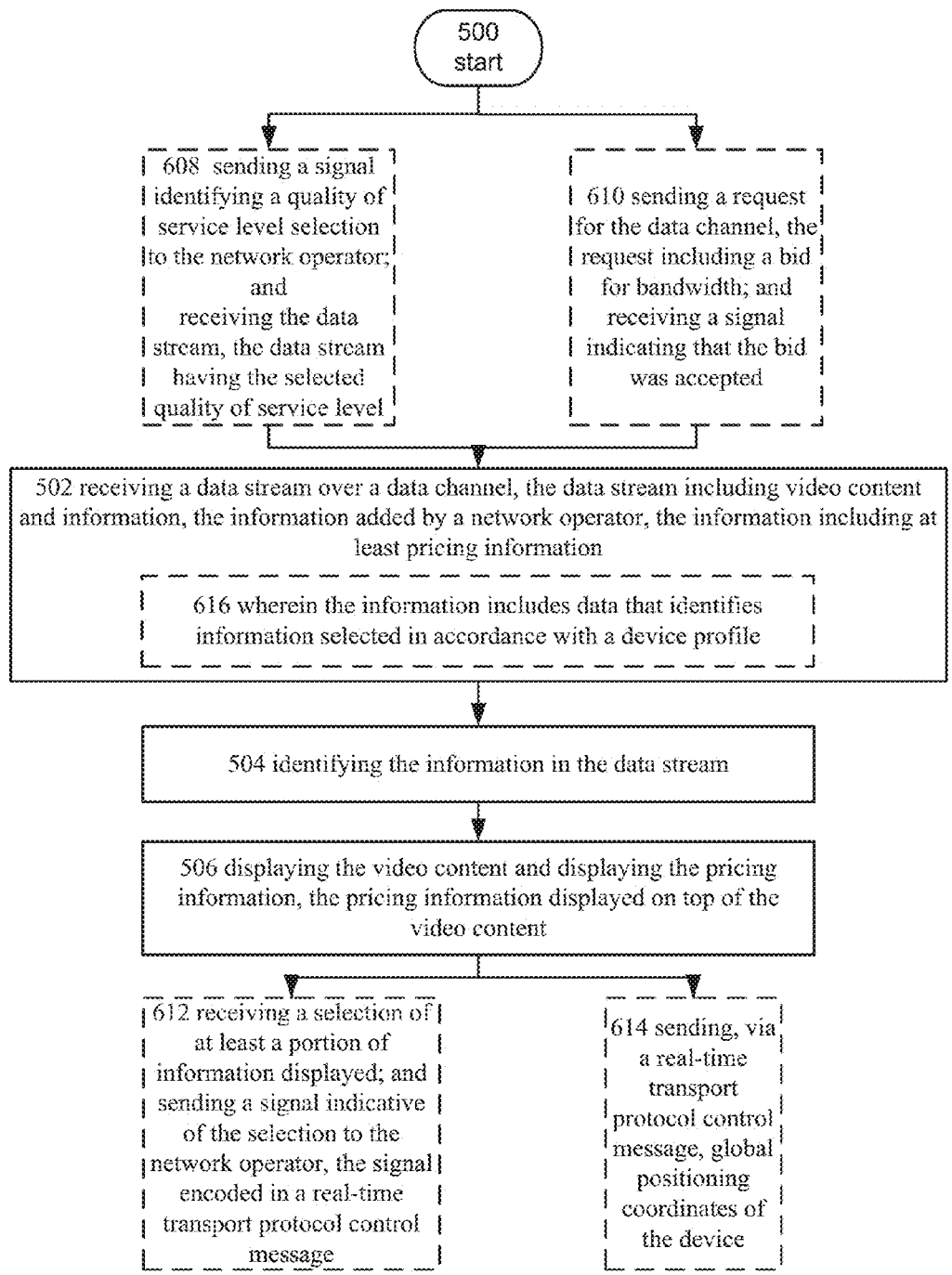
FIG. 6 depicts an alternative embodiment of the operational procedure of FIG. 5.

Referring now to FIG. 6, it depicts an alternative embodiment of the operational procedure of FIG. 5 including additional operations 608-616. Operations 608-616 are indicated in dashed lines which indicates that the operations are considered optional. Now, turning to operation 608 it depicts sending a signal identifying a quality of service level selection to the network operator; and receiving the data stream, the data stream having the selected quality of service level. In an embodiment including operation 608, a user interface 212, e.g., a display having a touch interface, can receive a selection of a quality of service (QOS) level and the device 200 can send the signal to the BTS 402. In this embodiment, a device 200 may request video content and a prompt can be displayed asking for a user to select a quality of service level for the data channel and/or the video content. That is, QOS level can be associated with the content, the channel, or both the content and the channel. For example, one quality of service level may allow for data transfer rates of 2 mb whereas another level may have a transfer rate capped at 1 mb. Another option may include receiving a streaming video that is 2 mb in size compared to receiving a copy that is 5 mb worth of data. In the instance where the QOS level is related to the bandwidth, the signal can be sent to the BSC 404 and the BSC 404 can be configured to provide a data channel with the selected QOS level. In the instance where the QOS level is related to the video content, the MS 466 can include data with different levels of detail and the MS 466 can be configured to select the video having the desired size.

Continuing with the description of FIG. 6, operation 610 shows sending a request for the data channel, the request including a bid for bandwidth; and receiving a signal indicating that the bid was accepted. In an embodiment that includes operation 610, the device 200 can send a request for a data channel and a bid, that is, a price that the user is willing to pay for bandwidth. For example, and referring to FIG. 3, in an embodiment the device 200 can be within range of BTS maintained by various network operators. In the instance that a user of the device 200 wants to receive data, e.g., content stored on a server, a website, etc., the user could place a bid that indicates how much he/she is willing to pay to access the data and the device 200 could send a request on broadcast control channels of the BTS in the area. The request can be routed to an arbiter 314 and the arbiter 314 can determine whether the request can be honored based on the bid. For example, the arbiter 314 can access information that identifies the current network load and a table of information that maps current network load to different prices. If the price offered by the user is greater than the price in the table for the current network load then the bid can be accepted.

In an embodiment where each network operator includes an arbiter 314, each arbiter can determine whether the network operator can provide the data channel at the requested bid by comparing current network load to a network load table which indicates pricing for different network statuses. If more than one network operator can service the request a reverse auction can be executed and the operator that submits the lowest price can service the request. In this embodiment, and referring to FIG. 4, the winning arbiter 314 can send a message to the mobile switching center 408 directing it to allocate a data channel to the device 200 and a data channel can be allocated to the device 200. In this example the device 200 can receive a signal indicating that the bid was accepted and the data channel can be established. Additionally routing and accounting information can be sent to the VLR 414 of the winning network operator.

Continuing with the description of FIG. 6, operation 612 illustrates receiving a selection of at least a portion of information displayed; and sending a signal indicative of the selection to the network operator, the signal encoded in a real-time transport protocol control message. For example, in an embodiment the information displayed on top of the video content can be selectable, e.g., an advertisement could be displayed on a portion of the display and can be selected by using user interface 212. In this example if a user selects a portion of the displayed content, e.g., by using user interface 212, a signal indicative of the selection can be sent back to the network operator. In this example the signal can be sent on a control channel for the video stream. For example, in an embodiment the real-time transport protocol (RTP) can be used to deliver the video content and information to the device 200. The RTP has a related protocol called RTP control protocol (RTCP) that can be used to send out-of-band control information back to the network operator. In this example embodiment information indicative of the selection can be encoded in one or more RTCP packets. In the same or other embodiments the selection can be sent along with information that includes information such as bytes sent, packets sent, lost packets, jitter, feedback, and round trip delay. An application may use this information to increase the quality of service, perhaps by limiting flow or using a different codec.

Continuing with the description of FIG. 6, operation 614 shows sending, via a real-time transport protocol control message, global positioning coordinates of the device. For example, in an embodiment that includes operation 614, global positioning coordinates of the device 200 can be encoded in at least one RTCP packets and sent to the network operator. The GPS coordinates of the device 200 can be used to refine the information that is sent to the device 200. For example, certain advertisements, locations of interest, traffic, etc., can be selected by the streaming information service 464 based on the location of the device 200 and sent to the device via the data channel. For example, advertisements can be stored in a MS 466 and can be associated with a, location, a user profile, and/or the streaming video. The SIS 464 can then use the information to select an advertisement based on the location of the device 200.

Continuing with the description of FIG. 6, operation 616 shows an embodiment where the information includes data that identifies information selected in accordance with a device profile. For example, a user profile can be stored by the network operator that indicates information that the user of device 200 is interested in. In this example the SIS 464 can obtain the profile and select information to send to the device 200 based on the profile. For example, a user may indicate that they are interested in the stock market. The SIS 464 could obtain stock market ticker information and encoded it into the data stream. Profile information can be stored in, for example the HSS 450 and the information can be stored in, for example, a media server 466. The SIS 464 can have access to information obtained from various sources, e.g., sports information, headline news, location information of friends, RSS feeds from websites, etc. When video is streamed to the device 200 the SIS 464 can be configured to identify what information is of interest to the user based on the profile associated with the device 200, e.g., based on the international subscriber identifier associated with the device 200, and select certain information based on the profile.

Figure 7:
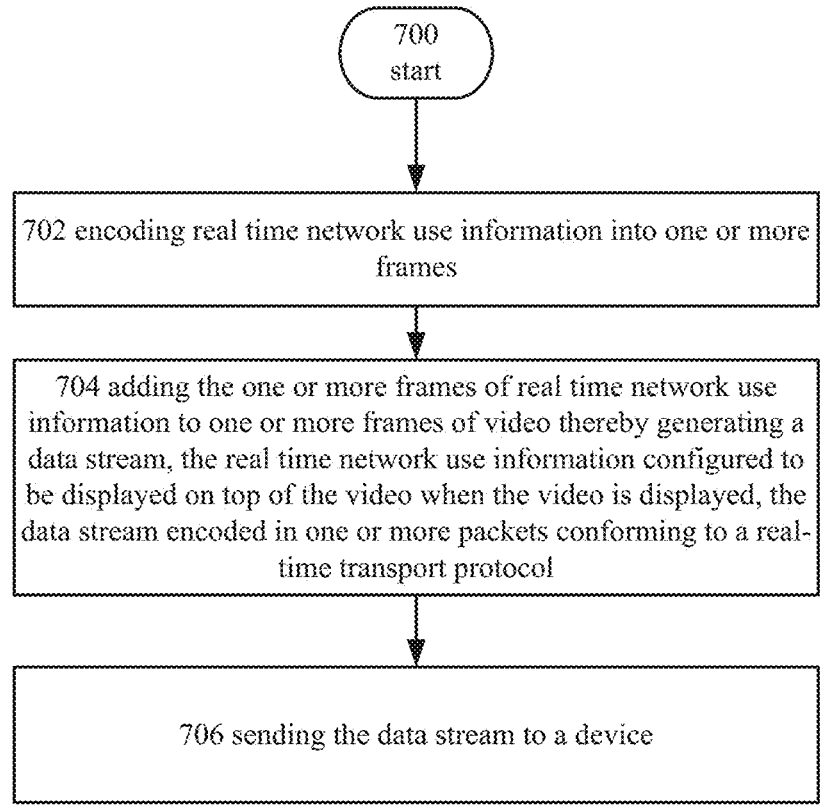
FIG. 7 depicts operational procedure for practicing aspects of the present disclosure.

Referring now to FIG. 7, it shows an operational procedure including operations 700, 702, 704, and 706. As shown by the figure, operation 700 begins the operational procedure and operation 702 depicts encoding real time network use information into one or more frames. In an example information that identifies real time network use information can be encoded into one or more video frames by, a SIS 464. That is, the SIS 464 can encode information into video frames such that the SIS 464 information is contained in the inband portion of a video signal streamed to the device 200. The real time network use information can, for example, indicate quality of service, bandwidth consumed while a video is being streamed, bandwidth consumed per month, price per byte or megabyte of bandwidth, monthly remaining bandwidth, data transfer rate, etc. In an embodiments this information can be gathered by the SIS 464 from various sources in the network such as, for example, HSS 450, MSC 408, MS 466, BTS 402, GGSN 436, etc.

Continuing with the description of FIG. 7, operation 704 shows adding the one or more frames of real time network use information to one or more frames of video thereby generating a data stream, the real time network use information configured to be displayed on top of the video when the video is displayed, the data stream encoded in one or more packets conforming to a real-time transport protocol. The SIS 464 can be configured to add the frames of real time network use information to frames of video and the combination can be considered a data stream that can be sent to the device 200. In this example the data stream can be encoded into one or more packets of information conforming to the RTP. As stated above, the RTP provides a standardized packet format for delivering audio/video content over the internet via a point to point connection. In an embodiment including operation 704, the real time network use information can be encoded into a format that can be consumed by the device 200 and direct a video player of the device to render the real time network use information over top of the video content. The real time information can be displayed in such a way that is non-intrusive, e.g., it could be located in the corner of the screen, can be displayed in a scrolling ticker, or can be rendered when the user interface 212 is manipulated.

Continuing with the description of FIG. 7, operation 706 shows sending the data stream to a device. Once the real time information is added to the video the resulting data stream can be sent to a device 200. For example, the data stream can be propagated to the device 200 by a BTS 402 and other network operator components. In this example embodiment the device 200 could receive the data stream and render the video and real time network use information.

Figure 8:
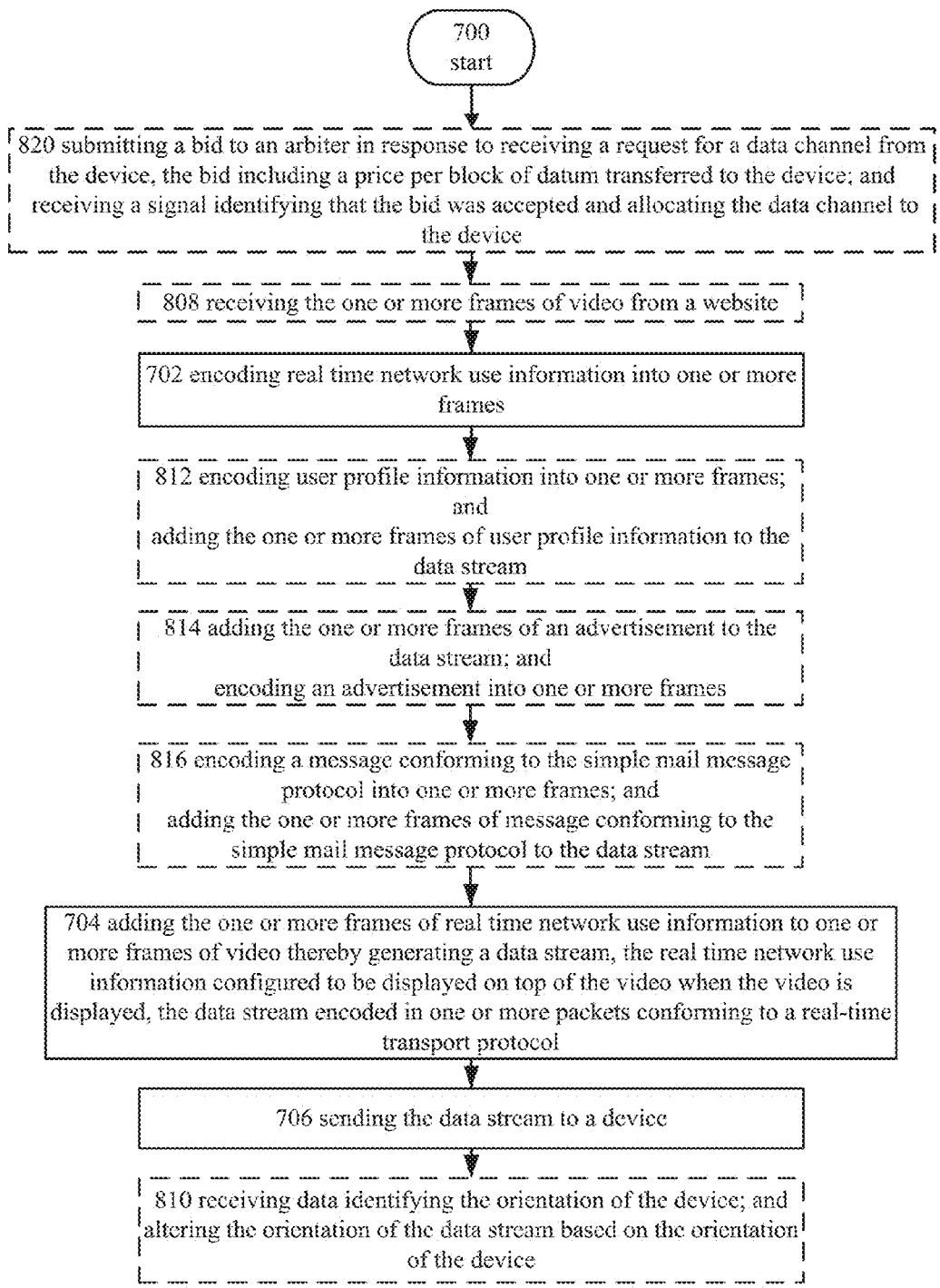
FIG. 8 depicts an alternative embodiment of the operational procedure of FIG. 7.

Referring now to FIG. 8, it illustrates an alternative embodiment of the operational procedure of FIG. 7 including the additional operations 808-818. Referring to operation 808, it shows receiving the one or more frames of video from a website. Similar to that described above, the video can be streamed from for example, a website accessible via an external IP network 438. That is, device 200 could receive content hosted by a website. IP packets indicative of video content can be received by, for example, the GGSN 436, forwarded to the MGW 448, and to the streaming information service 464. The SIS 464 can in this example add information to the video stream such as, for example, real time network use information. In an embodiment the real time network use information can include price information for the video. The price information can be associated with the amount of bandwidth that is needed to stream the video. In this example the SIS 464 can receive information indicating how large the video content is and determine how much bandwidth is needed to transfer the data and insert this determined information into the video content. The information can be encoded into the video content; the stream can be placed in one or more packets; and the packets can be routed back to the GGSM 436, and eventually to the device 200.

Continuing with the description of FIG. 8, it illustrates 810 which shows receiving data identifying the orientation of the device; and altering the orientation of the data stream based on the orientation of the device. In an example embodiment that includes operation 810 the orientation of the video stream can be altered at the network level to conform to the orientation of the device 200. For example, the device 200 can include an accelerometer that can be used to determine how the device is oriented 200. Information indicative of the orientation can be sent to the network operator via one or more packets, e.g., RTCP packets. The orientation information contained in the packets can be propagated to the SIS 464 and the SIS 464 can change the orientation of the video that is being streamed by changing the way that the frames of video are encoded into packets. In this way the orientation of the streaming video can be determined at the network.

Continuing with the description of FIG. 8, it illustrates 812 which shows encoding user profile information into one or more frames; and adding the one or more frames of user profile information to the data stream. For example, a user profile can be stored by the network operator that indicates information that the user of device 200 is interested in. In this example the SIS 464 can obtain the profile and select information to sent to the device 200 based on the profile. For example, a user may indicate that they are interested in the stock market. The SIS 464 could obtain stock market ticker information and encoded it into the data stream.

Referring now to operation 814, it depicts adding the one or more frames of an advertisement to the data stream; and encoding an advertisement into one or more frames. In an embodiment an advertisement along with an embedded url can be encoded into one or more video frames. For example, the SIS 464 can generate an xml document that includes an image and an associated url. The SIS 464 can then add the advertisement frames to the video frames and send the combination to the device 200. The url can be part of the content or displayed on top of the content for example. The advertisement can be selected and information indicative of the selection can be sent to the network operator.

Referring now to operation 816, it depicts encoding a message conforming to the simple mail message protocol into one or more frames; and adding the one or more frames of message conforming to the simple mail message protocol to the data stream. According to an embodiment that includes operation 816, the SIS 464 can be configured to receive information that identifies that the network has received a simple mail message addressed to the device 200. For example, the SMSC 424 can pass the message to the SGSN 432 and the SGSN 432 can determine that the device 200 has an open data channel and is receiving streaming video. In this example, the SGSN 432 can send the message to the MGW 448 and it can be passed to the SIS 464. The SIS 464 can parse the message and encode the metadata, e.g., the time that the message was received, the identity of the sender, etc., and/or the payload of the message, e.g., the text, into one or more frames. These frames can then be added to the streaming video and sent to device 200. Similar to that described above, the SMS information can then be rendered on top of the streaming video by the user interface 212 of the device 200.

Continuing with the description of FIG. 8, operation 820 shows submitting a bid to an arbiter in response to receiving a request for a data channel from the device, the bid including a price per block of datum transferred to the device; and receiving a signal identifying that the bid was accepted and allocating the data channel to the device. Continuing with the description of FIG. 8, in an embodiment the network operator can receive a signal from a device 200 via the BSC 404 for example. The signal can be a request for bandwidth to access a multimedia object stored in a MS 466, access a website, send a SMS, receive a streaming video, etc. In this embodiment the request can be submitted to the arbiter 314. The arbiter 314 can gather network status information such as current network usage, time of day, network usage during the past 10 minutes, etc., and determine whether the price per block of datum transferred offered by the device 200 can be accepted. In the event that the bid can be accepted, a confirmation signal can be sent to the device 200 and the BSC 404 can allocate a data channel to the device 200. As the device 200 uses the bandwidth, e.g., by watching a streaming video, a user account associated with the device 200 in the HLR 412 can be charged per block of datum transferred.

In the same, or other embodiments the arbiter 314 can engage in a reverse auction with arbiters from one or more network operators. For example, after a determination is made that the bid can be accepted. The arbiter 314 can communicate with arbiters from other network operators. Each network operator arbiter can each exchange information that identifies the lowest price they can offer and the arbiter that can offer the lowest price can be configured to service the request. In this example if the network operator that maintains the account of the device 200 is not the arbiter 314 that wins the bid, it can exchange information with the winning network operator so that the winning network operator can identify the device 200 within the wireless network. The winning network operator can then send a signal to the device 200 indicating that it will be servicing the request and identify the price per datum that will be used in the transaction.

Figure 9:
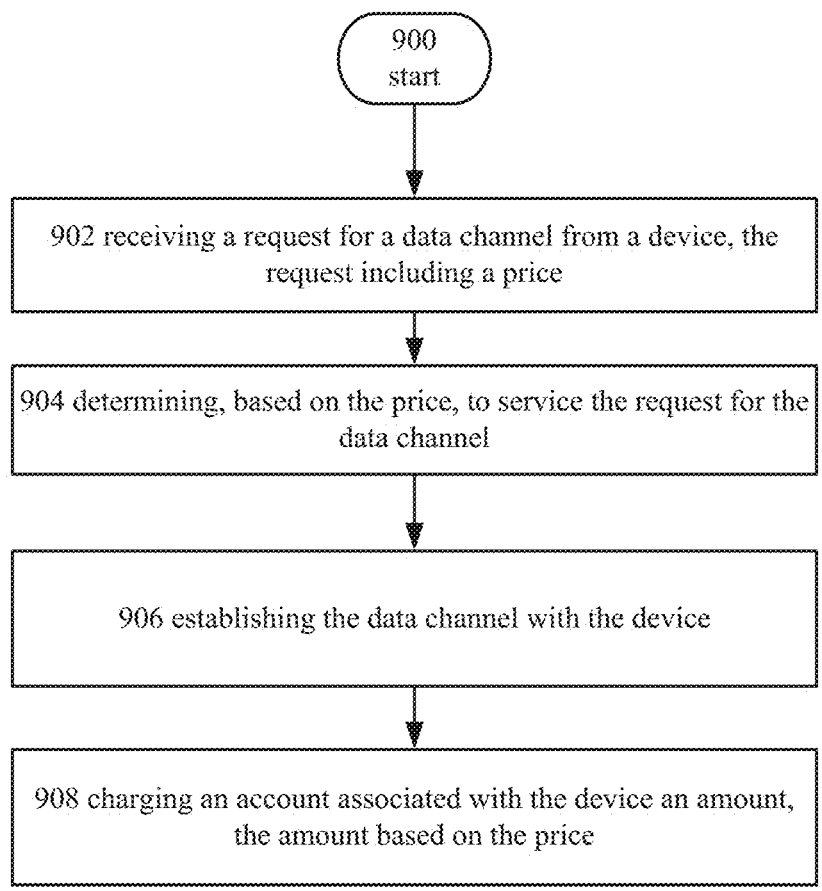
FIG. 9 depicts operational procedure for practicing aspects of the present disclosure.

Referring now to FIG. 9, it illustrates an operational procedure for practicing aspects of the present disclosure including operations 900-908. As shown by the figure, operation 900 begins the operational procedure and operation 902 shows receiving a request for a data channel from a device, the request including a price. For example, in an embodiment the network operator can receive a signal from a device 200 via the BSC 404 for example. The signal can be a request for a data channel so that the device 200 can access data indicative of, for example, MMS messages stored in a MS 466, a website, a SMS, or streaming video.

Continuing with the description of FIG. 9, operation 904 shows determining, based on the price, to service the request for the data channel. In this embodiment the request can include information indicative of a price and can be submitted to the arbiter 314. The arbiter 314 can gather network status information such as current network usage, time of day, network usage during the past 10 minutes, etc., and determine whether the data channel can be allocated based on the network conditions and the price.

Continuing with the description of FIG. 9, operation 906 depicts establishing the data channel with the device. In the event that the price can be accepted, a confirmation signal can be sent to the device 200 and the BSC 404 can allocate the data channel to the device 200.

Continuing with the description of FIG. 9, operation 908 depicts charging an account associated with the device an amount, the amount based on the price. For example, an account associated with the device 200 can be charged an amount of money based on the price. In a specific example, the price could be a maximum amount of money that a user is willing to pay. In this specific example the maximum price can be used by the arbiter 314 in a reverse auction with arbiters from one or more other network operators. For example, after a determination is made that the bid can be accepted. The arbiter 314 can communicate with arbiters from other network operators. Each network operator arbiter can each exchange information that identifies the lowest price they can offer and the arbiter that can offer the lowest price can be configured to service the request. In this example if the network operator that maintains the account of the device 200 is not the arbiter 314 that wins the bid, it can exchange information with the winning network operator so that the winning network operator can identify the device 200 within the wireless network. The winning network operator can then send a signal to the device 200 indicating that it will be servicing the request and identify the price per datum that will be used in the transaction.

Figure 10:
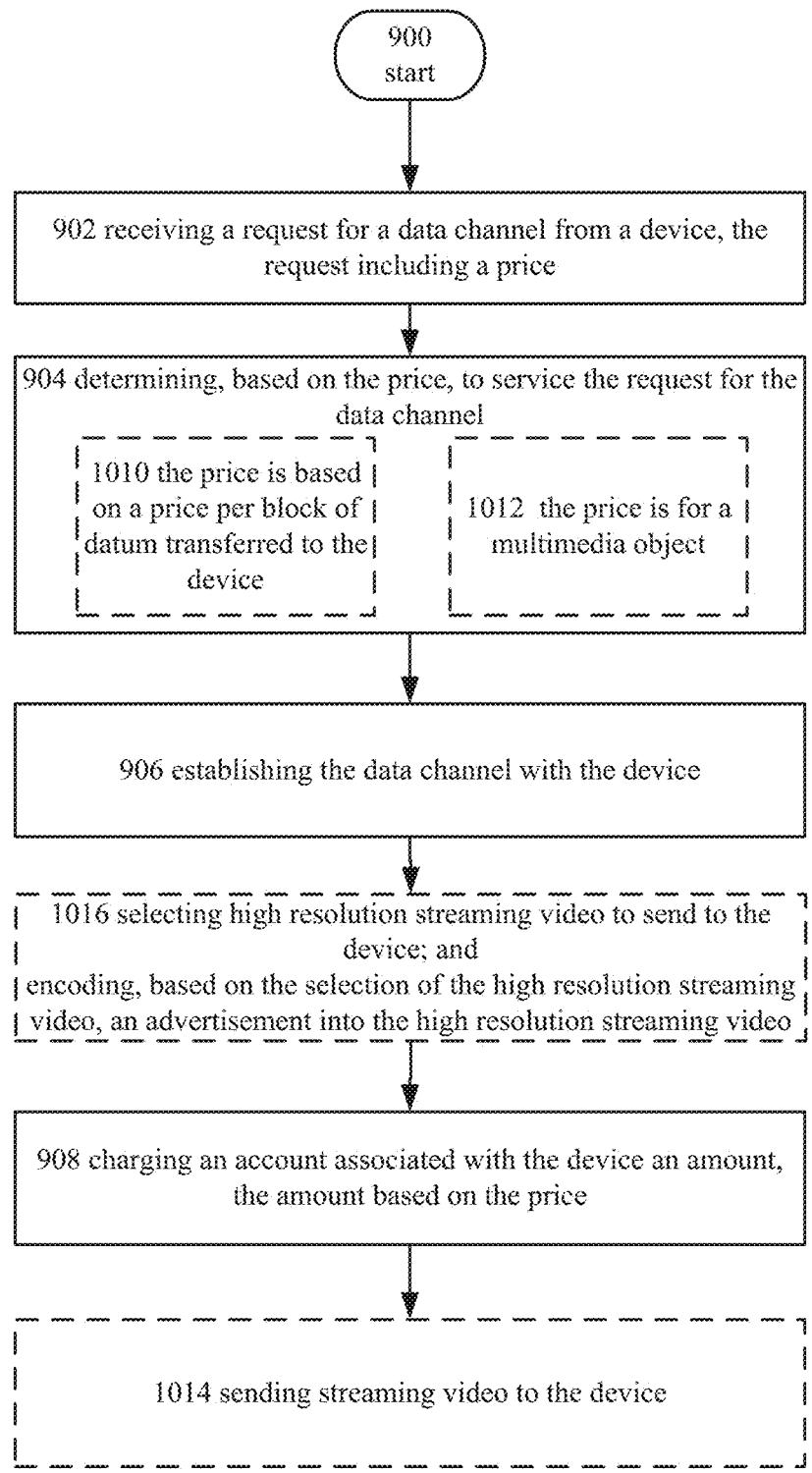
FIG. 10 depicts an alternative embodiment of the operational procedure of FIG. 9.

Referring now to FIG. 10, it depicts an alternative embodiment of the operational procedure of FIG. 9 including the additional operations 1010-1016. Referring now to operation 1010, it illustrates an embodiment where the price is based on a price per block of datum transferred to the device. For example, in this embodiment the price can be based on a price per an amount of data transferred. That is, the price can be for the number of bytes transferred to the device. The price in the request could be, for example, 10 cents per megabyte of data. The network operator can receive the price and the arbiter 314 can determine whether the price can be accepted based on the current network conditions. If the arbiter 314 determines that the price can be accepted, the data channel can be established with the device 200.

Continuing with the description of FIG. 10, operation 1012 shows an embodiment where the price is for a multimedia object. In an embodiment the price can be for a multimedia object such as a ring tone, multimedia message, digital song, etc. In this example embodiment the price could be based on the quality of the multimedia object, e.g., higher quality objects can be made more expensive than other objects, or the price could be based on the current network conditions. For example if a network operator is experiencing high network usage the price may not be accepted and instead the network operator could store the request in a table and when the price can be accepted, e.g., when the network is operating at a lower capacity, the multimedia object can be sent to the device 200. In this example a message can be sent to the device 200 indicating that the price was not accepted and the user can either increase the price or the network will service the request when network conditions improve.

Continuing with the description of FIG. 10, operation 1014 shows sending streaming video to the device. A data stream can be sent to a network adaptor 208 of a device 200. For example, the BST 402 of FIG. 4 can assign a data channel to the device 200 based on the acceptance of the price and the data channel can be established between the BTS 402 and the device 200. In this example packets indicative of the streaming video can be sent over the data channel. In one example embodiment the video can be streaming from, for example, an external IP network 438 or from a media server 466. That is, device 200 could receive content hosted by a website and/or on demand videos from a network operator.

As shown by FIG. 10, in an example embodiment the operational procedure 900 can also include operation 1016 which illustrates selecting high resolution streaming video to send to the device; and encoding, based on the selection of the high resolution streaming video, an advertisement into the high resolution streaming video. In an embodiment that includes operation 1016, the MS 466 can have access to video content that has different resolutions, e.g., more or less data. The MS 466 can be configured to receive a request from device 200 for a high quality version of the streaming video. In response to the request, the MS 466 can be configured to select an advertisement to insert into the streaming video instead of charging an account associated with the device 200 an extra amount. For example, an advertisement along with an embedded url can be encoded into one or more video frames. For example, the SIS 464 can generate an xml document that includes an image and an associated url. The SIS 464 can then add the advertisement frames to the video frames and send the combination to the device 200. In this embodiment the high resolution version of the streaming video may have a higher cost than the lower resolution version. Instead of charging an account for the higher resolution, the MS 466 can be configured to add an advertisement to the streaming video. That is, the operator of the device 200 can receive high resolution streaming video without having to pay an additional amount if they are willing to receive advertisements.

Figure 11:
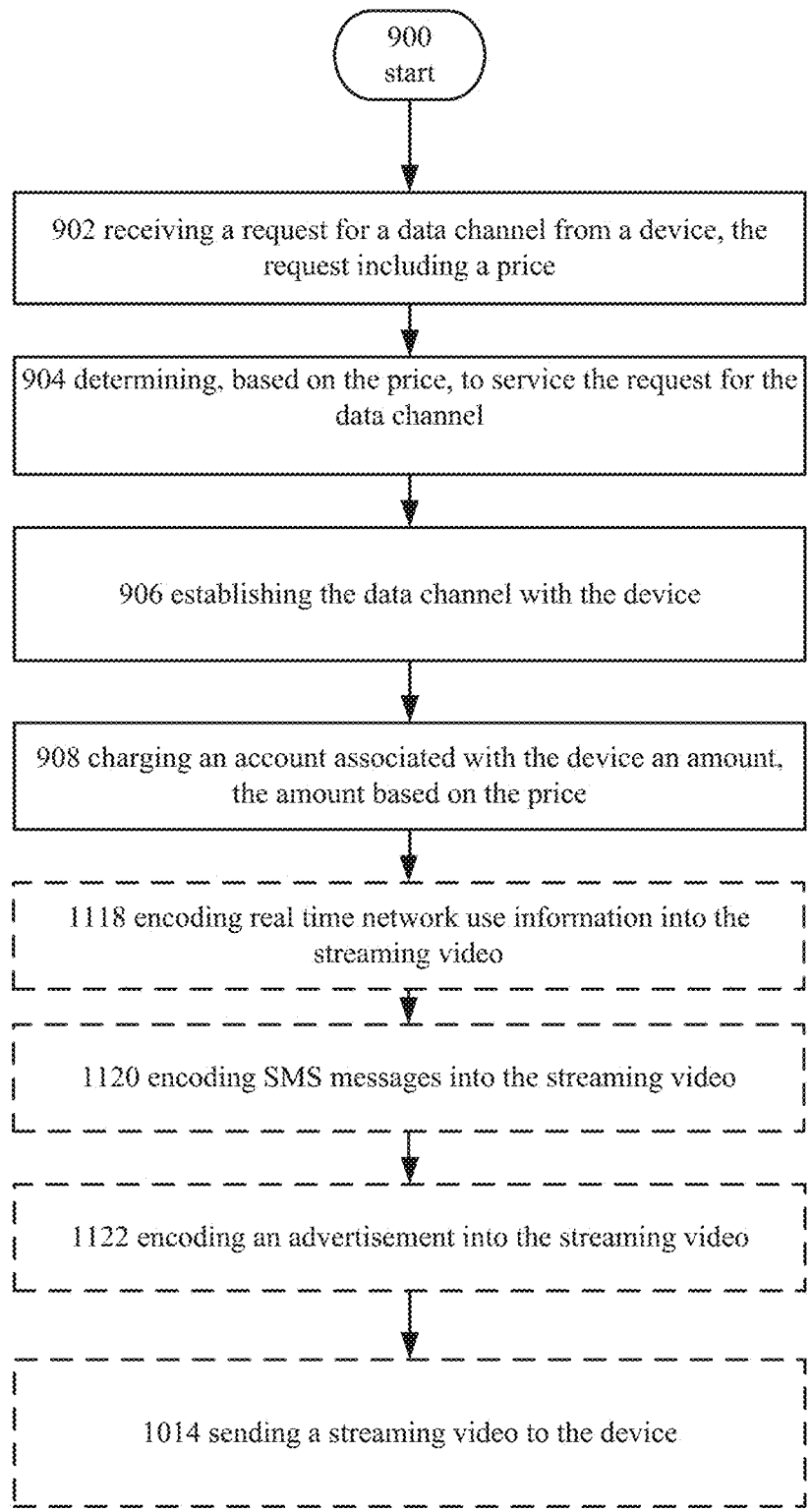
FIG. 11 depicts an alternative embodiment of the operational procedure of FIG. 10.

Referring now to FIG. 11, it illustrates an alternative embodiment of the operational procedure of FIG. 10 including the additional operations 1118-1122. Referring now to operation 1118, it depicts encoding real time network use information into the streaming video. In an example information that identifies real time network use information can be encoded into one or more video frames by, a SIS 464. That is, the SIS 464 can encode real time network use information into video frames such that the SIS 464 information is contained in the inband portion of the video signal streamed to the device 200. The real time network use information can, for example, indicate quality of service, bandwidth consumed while the video is being streamed, bandwidth consumed per month, price per byte or megabyte of bandwidth, monthly remaining bandwidth, data transfer rate, etc. In embodiments this information can be gathered by the SIS 464 from various sources in the network such as, for example, HSS 450, MS 466, BTS 402, GGSN 436.

Referring now to operation 1120, it depicts encoding SMS messages into the streaming video. According to an embodiment that includes operation 1116, the SIS 464 can be configured to receive information that identifies that the network has received a simple mail message addressed to the device 200. For example, the SMSC 424 can pass the message to the SGSN 432 and the SGSN 432 can determine that the device 200 has an open data channel and is receiving streaming video. In this example, the SGSN 432 can send the message to the MGW 448 and it can be passed to the SIS 464. The SIS 464 can parse the contents of the message and encode the metadata, e.g., the time that the message was received, the identity of the sender, etc., and/or the payload of the message, e.g., the text, into one or more frames. These frames can then be added to the streaming video and sent to the device 200. Similar to that described above, the SMS information can then be rendered on top of the streaming video by the user interface 212 of the device 200.

Referring now to operation 1122, it depicts encoding an advertisement into the streaming video. In an embodiment an advertisement along with an embedded url can be encoded into one or more video frames. For example, the SIS 464 can generate an xml document that includes an image and an associated url. The SIS 464 can then add the advertisement frames to the video frames and send the combination to the device 200.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof.

What is claimed is:

1. A method comprising:
   generating, by a network device, data comprising video, the video streamed to a remote device;
   receiving, by the network device, orientation data identifying an orientation of the remote device, wherein the orientation of the remote device is based on an accelerometer;
   altering, by the network device, the orientation of the data comprising video based on the orientation of the remote device that is based on the accelerometer; and
   sending, by the network device, the altered orientation of the data comprising video to the remote device.

2. The method of claim 1, further comprising:
   receiving the data comprising video from a website.

3. The method of claim 1, further comprising:
   encoding user profile information into the data comprising video.

4. The method of claim 1, further comprising:
   encoding an advertisement into the data comprising video.

5. The method of claim 1, further comprising:
   encoding a message conforming to a simple mail message protocol into the data comprising video.

6. The method of claim 1, further comprising:
   submitting a bid to an arbiter in response to receiving a request for a data channel from the device, the bid comprising a price per block of datum transferred to the device; and
   receiving an indication that the bid was accepted and the data channel was allocated to the device.

7. A network device comprising:
   a processor; and
   memory coupled to the processor, the memory comprising executable instructions that when executed by the processor cause the processor to effectuate operations comprising:
   generating data comprising video, the video streamed to a mobile device;
   receiving orientation data identifying an orientation of the mobile device, wherein the orientation of the mobile device is based on an accelerometer;
   altering the orientation of the data comprising video based on the orientation of the mobile device that is based on the accelerometer; and
   sending the altered orientation of the data comprising video to the device.

8. The system of claim 7, the operations further comprising:
   receiving the data comprising video from a website.

9. The system of claim 7, the operations further comprising:
   encoding user profile information into the data comprising video.

10. The system of claim 7, the operations further comprising:
    encoding an advertisement into the data comprising video.

11. The system of claim 7, the operations further comprising:
    encoding a message conforming to a simple mail message protocol into the data comprising the video.

12. The system of claim 7, the operations further comprising:
    submitting a bid to an arbiter in response to receiving a request for a data channel from the device, the bid comprising a price per block of datum transferred to the device; and
    receiving an indication that the bid was accepted and the data channel was allocated to the device.

13. A computer readable storage medium that is not a propagating signal, the computer-readable storage medium comprising executable instructions that when executed by a processor cause the processor to effectuate operations comprising:

generating data comprising video, the video streamed to a remote device;

receiving orientation data identifying an orientation of the remote device, wherein the orientation of the remote device is based on an accelerometer;

altering orientation of the data comprising video based on the orientation of the remote device that is based on the accelerometer; and sending the altered orientation of the data comprising video to the remote device.

14. The computer readable storage medium of claim 13, the operations further comprising:

encoding user profile information into the data comprising video.

15. The computer readable storage medium of claim 13, the operations further comprising:

encoding an advertisement into the data comprising video.

16. The computer readable storage medium of claim 13, the operations further comprising:

encoding a message conforming to a simple mail message protocol into the data comprising video.

17. The computer readable storage medium of claim 13, the operations further comprising:

submitting a bid to an arbiter in response to receiving a request for a data channel from the device, the bid comprising a price per block of datum transferred to the device; and receiving an indication that the bid was accepted and the data channel was allocated to the device.

18. The method of claim 1, wherein the remote device is a mobile phone.

19. The method of claim 1, wherein the altering the orientation of the data comprising the video comprises changing a way that frames of video are encoded into packets.

* * * * *